(12) United States Patent
Hashimoto

(10) Patent No.: US 11,699,111 B2
(45) Date of Patent: Jul. 11, 2023

(54) CONTROL DEVICE AND MONITORING SYSTEM OF MANUFACTURING DEVICE

(71) Applicant: FANUC CORPORATION, Yamanashi (JP)

(72) Inventor: Arito Hashimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 606 days.

(21) Appl. No.: 16/567,228

(22) Filed: Sep. 11, 2019

(65) Prior Publication Data
US 2020/0118050 A1   Apr. 16, 2020

(30) Foreign Application Priority Data
Oct. 11, 2018 (JP) ................................. 2018-192660

(51) Int. Cl.
G05B 19/418 (2006.01)
G05B 17/02 (2006.01)
(Continued)

(52) U.S. Cl.
CPC ............. *G06Q 10/06* (2013.01); *G05B 17/02* (2013.01); *G05B 19/4183* (2013.01); *G06Q 50/04* (2013.01)

(58) Field of Classification Search
CPC ........ G06Q 10/06; G06Q 50/04; G05B 17/02; G05B 19/4183; G05B 2219/31082;
(Continued)

(56) References Cited

U.S. PATENT DOCUMENTS 7,346,402 B1 * 3/2008 Stahl ...................... G05B 17/02
700/28
10,198,422 B2 * 2/2019 Lee ......................... G06F 40/18
(Continued)

FOREIGN PATENT DOCUMENTS

JP         8-129411    5/1996
JP          9-6428     1/1997
(Continued)

OTHER PUBLICATIONS

Notification of Reasons for Refusal dated Nov. 10, 2020 in Japanese Patent Application No. 2018-192660.

*Primary Examiner* — Juan C Ochoa
(74) *Attorney, Agent, or Firm* — Wenderoth, Lind & Ponack, L.L.P.

(57) ABSTRACT

A control device and a monitoring system of a manufacturing device, capable of enabling an external device to acquire data easily without grasping a configuration of the control device having a plurality of function control units. A control device of a manufacturing device includes a display function control unit and a control function control unit. The display function control unit includes a data model generation unit, and the control function control unit includes a data model generation unit. The display function control unit includes: a data model acquiring unit that acquires a data model generated by the data model generation unit of the control function control unit; and a data model integration unit that integrates a data model generated by the data model generation unit of the display function control unit with a data model of the control function control unit acquired by the data model acquiring unit.

5 Claims, 10 Drawing Sheets

(51) Int. Cl.
*G06Q 10/06* (2023.01)
*G06Q 50/04* (2012.01)

(58) Field of Classification Search
CPC ...... G05B 19/4185; G05B 2219/31124; Y02P 90/02; Y02P 90/30
USPC .................................................... 703/20, 13
See application file for complete search history.

(56) References Cited

U.S. PATENT DOCUMENTS

2009/0112335 A1* 4/2009 Mehta ................ G05B 23/0243
700/29
2019/0286114 A1* 9/2019 Przybylski ........... G06Q 10/063

FOREIGN PATENT DOCUMENTS

| JP | 2000-49891 | | 2/2000 |
|----|------------|---|--------|
| JP | 2003-163978 | | 6/2003 |
| JP | 2003163978 | * | 6/2003 |
| JP | 2018-151726 A | | 9/2018 |
| WO | 2017/077887 | | 5/2017 |

* cited by examiner

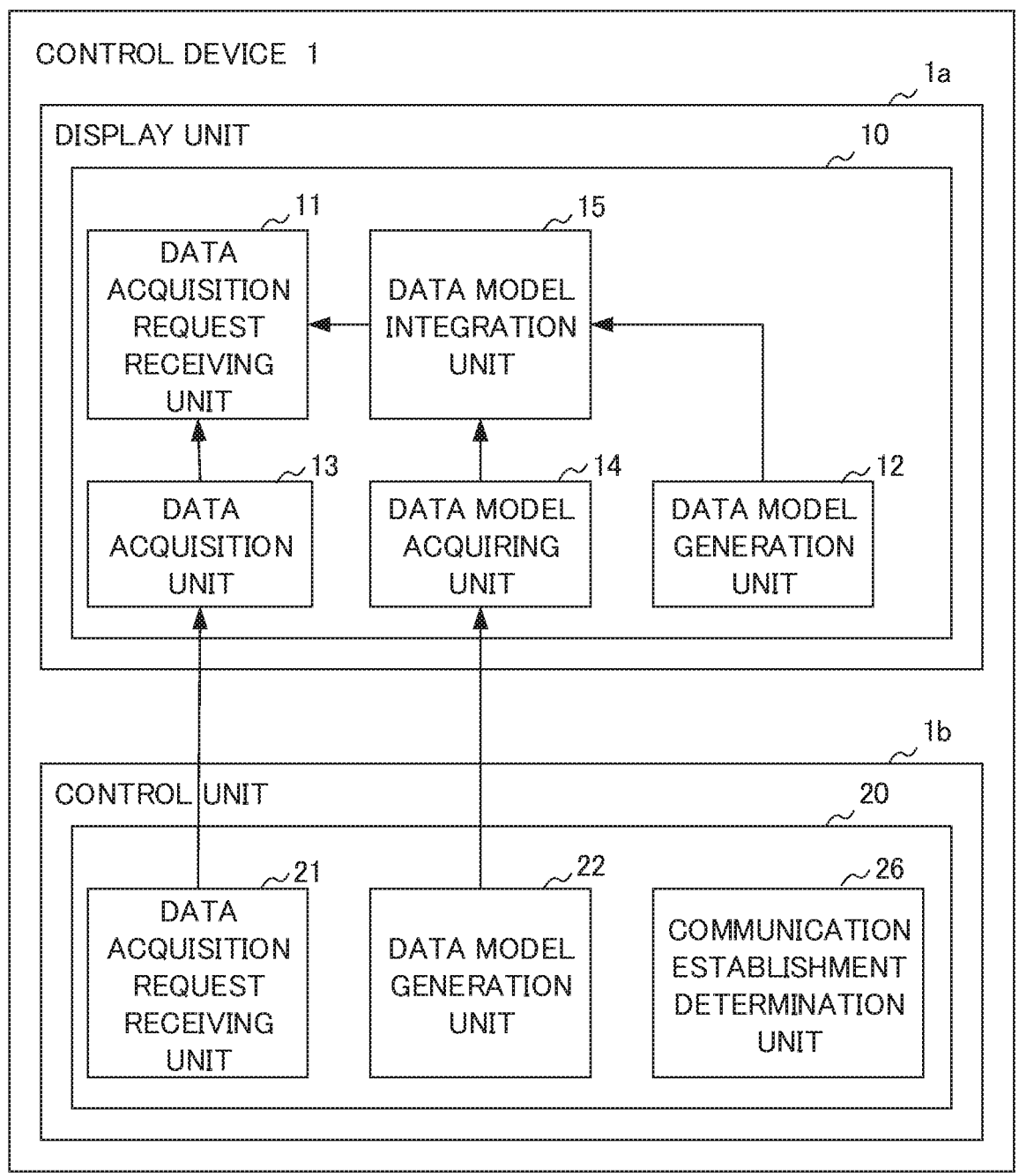

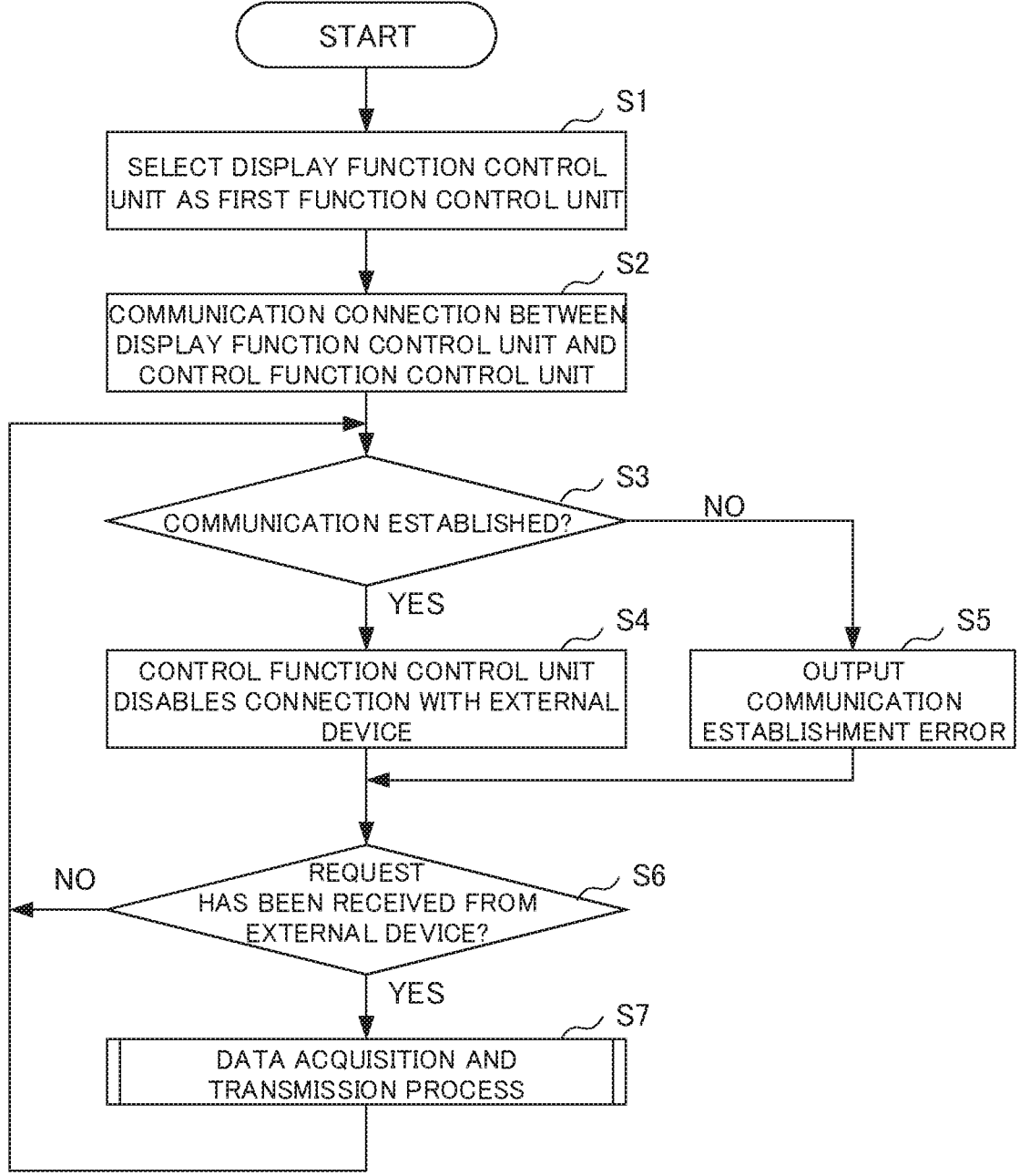

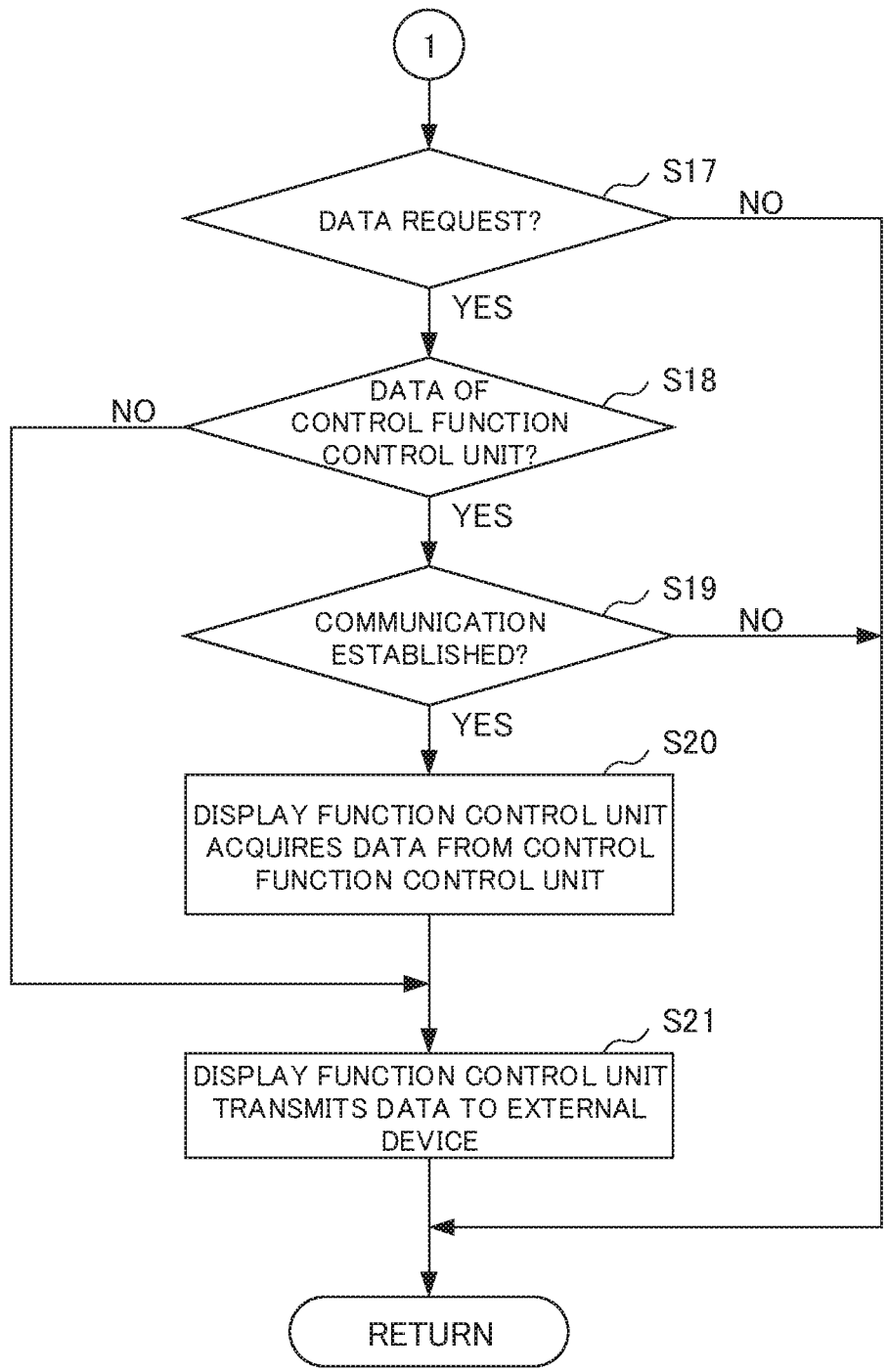

CONTROL DEVICE AND MONITORING SYSTEM OF MANUFACTURING DEVICE

This application is based on and claims the benefit of priority from Japanese Patent Application No. 2018-192660, filed on 11 Oct. 2018, the content of which is incorporated herein by reference.

BACKGROUND OF THE INVENTION

Field of the Invention

The present invention relates to a control device and a monitoring system of a manufacturing device.

Related Art

Conventionally, a plurality of machines, for example, such as, a machine tool or an industrial robot (the machines include various machines such as a service robot, a forging machine, and an injection molding machine, and hereinafter, will be also referred to as "manufacturing devices") are used in a manufacturing site. In a manufacturing site, manufacturing devices of a plurality of manufacturers are generally used. Moreover, in a manufacturing site, communication connection with a plurality of manufacturing devices is established using a monitoring control system called SCADA (Supervisory Control And Data Acquisition) to control the processes of each manufacturing device and perform centralized monitoring. SCADA connects to a control device of each manufacturing device in order to acquire the state of each manufacturing device to acquire a data model for organizing respective pieces of data from each manufacturing device, and acquires the respective pieces of data on the basis of a data structure. For example, Patent Document 1 discloses a technology in which a system that processes data obtained from the manufacturing device acquires device information of a plurality of external apparatuses to generate a data model.

Patent Document 1: PCT International Publication No. WO2017/077887

SUMMARY OF THE INVENTION

However, in a control device of a manufacturing device, a function control unit of a control unit and a function control unit of a display unit have individual central processing units (CPUs). FIG. 7A illustrates a monitoring system 800 including an external device 4 and a manufacturing device 7 having a control device 8 as an example of SCADA. The control device 8 has a function control unit 81a of a display unit 81 and a function control unit 82a of a control unit 82. When the control device 8 has a plurality of function control units 81a and 82a as in this case, the function control unit 81a of the display unit 81 and the function control unit 82a of the control unit 82 may operate different applications. Moreover, the external device 4 needs to acquire data present in both the function control unit 81a of the display unit 81 and the function control unit 82a of the control unit 82. Therefore, the external device 4 needs to connect to the function control unit 81a of the display unit 81 and the function control unit 82a of the control unit 82 and needs to grasp the configuration of the control device 8.

As one of the methods in which the external device 4 does not need to grasp the configuration of the control device 8, a relaying device may be provided to relay data. FIG. 7B illustrates a monitoring system 900. In the monitoring system 900, an external device 4 is connected to a server 91 of a relaying device 9, and a client 92 of the relaying device 9 is connected to function control units 81a and 82a of a control device 8 of a manufacturing device 7. In this way, due to the relaying device 9, the external device 4 does not need to grasp the configuration of the control device 8. However, the relaying device 9 requires a plurality of supervisory applications to be operated in the relaying device 9 in order to control a plurality of function control units, which increases a processing load thereof. Furthermore, since it is necessary to input settings related to connection to the function control units 81a and 82a to the supervisory application of the relaying device 9, it takes a lot of time and effort. Moreover, the installation cost of the relaying device 9 is taken.

An object of the present invention is to provide a control device and a monitoring system of a manufacturing device, capable of enabling an external device to acquire data easily without grasping a configuration of the control device having a plurality of function control units.

(1) A control device (for example, a control device 1 to be described later) of a manufacturing device (for example, a manufacturing device 7 to be described later) including a plurality of function control units, wherein each of the plurality of function control units (for example, a display function control unit 10 and a control function control unit 20 to be described later) includes a data model generation unit (for example, a data model generation unit 12, 22 to be described later), a first function control unit (for example, a display function control unit 10 to be described later) among the plurality of function control units includes: a data model acquiring unit (for example, a data model acquiring unit 14 to be described later) that acquires a data model generated by the data model generation unit of a second function control unit (for example, a control function control unit 20 to be described later) other than the first function control unit; and a data model integration unit (for example, a data model integration unit 15 to be described later) that integrates a data model generated by the data model generation unit of the first function control unit with a data model of the second function control unit acquired by the data model acquiring unit.

(2) In the control device of the manufacturing device according to (1), each of the plurality of function control units may include a data acquisition request receiving unit (for example, a data acquisition request receiving unit 11, 21 to be described later), only the data acquisition request receiving unit of the first function control unit may connect to an external apparatus (for example, an external device 4 to be described later), and the data acquisition request receiving unit of the first function control unit may transmit the data model integrated by the data model integration unit to the external apparatus upon receiving a data model acquisition request from the external apparatus.

(3) In the control device of the manufacturing device according to (2), the first function control unit may include a data acquisition unit (for example, a data acquisition unit 13 to be described later) that acquires data of the second function control unit from the data acquisition request receiving unit of the second function control unit, and the data acquisition request receiving unit of the first function control unit may transmit the data of the second function control unit acquired by the data acquisition unit and the data of the first function control unit to the external apparatus upon receiving a data acquisition request from the external apparatus.

(4) In the control device of the manufacturing device according to any one of (1) to (3), some or all of the second function control units may include a communication establishment determination unit (for example, a communication establishment determination unit 26 to be described later) that determines whether communication with the first function control unit has been established.

(5) In the control device of the manufacturing device according to any one of (1) to (4), the first function control unit may control a display device (for example, a display unit 1a to be described later).

(6) A monitoring system (for example, a monitoring system 100 to be described later) according to the present invention may include: the control device of the manufacturing device according to any one of (1) to (5); and an external device connected to the control device.

According to the present invention, it is possible to provide a control device and a monitoring system of a manufacturing device, capable of enabling an external device to acquire data easily without grasping a configuration of the control device having a plurality of function control units.

BRIEF DESCRIPTION OF THE DRAWINGS

FIG. 2 is a functional block diagram of a control device according to the present embodiment.

FIG. 4 is a flowchart illustrating a data communication process of the control device according to the present embodiment.

FIG. 5B is a continuation of the flowchart illustrated in FIG. 5A.

DETAILED DESCRIPTION OF THE INVENTION

Embodiment

First, an overview of an embodiment of the present invention will be described. The present embodiment relates to a technology of allowing an external device to acquire data models and data of a plurality of function control units from a control device without grasping a configuration of a control device of a manufacturing device having the plurality of function control units.

[Monitoring System 100]

Figure 1:
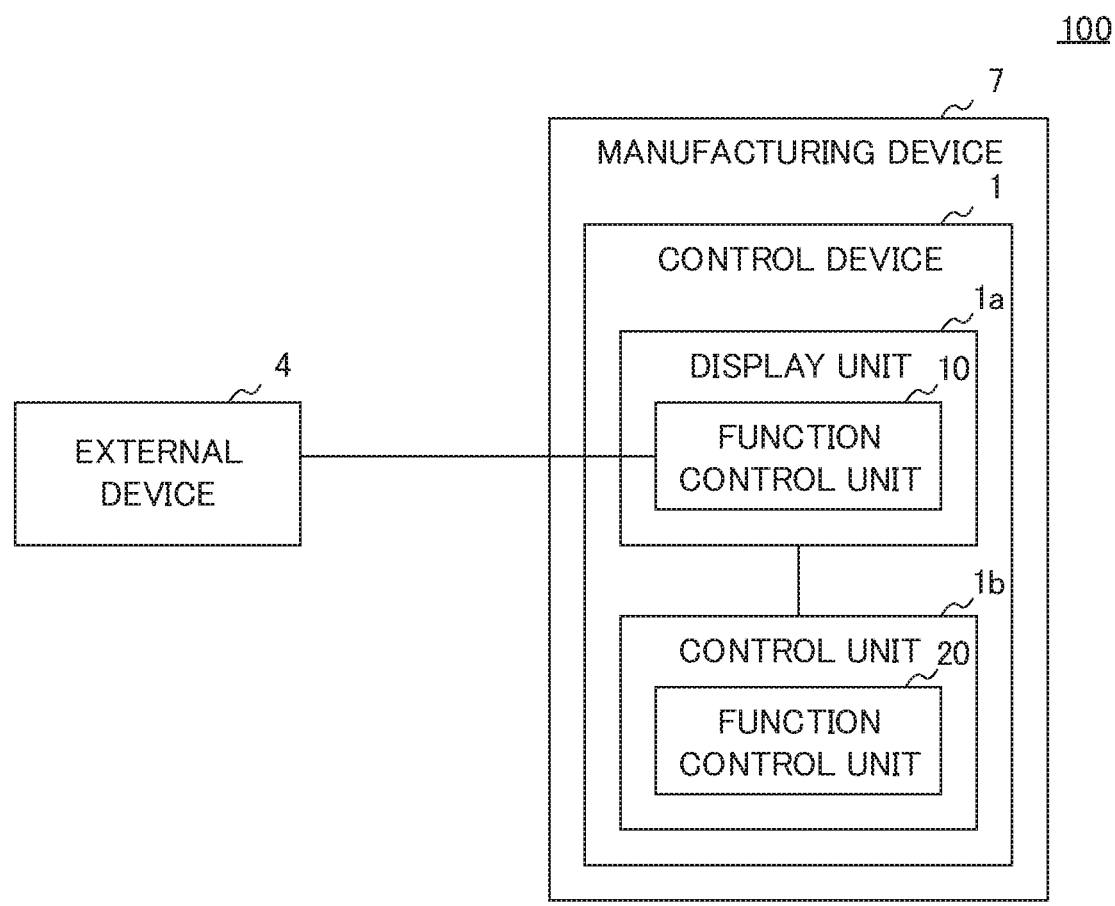
FIG. 1 is a general view of a monitoring system according to the present embodiment.

FIG. 1 is a general view of a monitoring system 100 according to the present embodiment. The monitoring system 100 is a system including a manufacturing device 7 and an external device 4 (an external apparatus). The external device 4 is SCADA, for example. The external device 4 establishes communication connection with the manufacturing device 7 to control processes of the manufacturing device 7 and perform centralized monitoring.

Specifically, the manufacturing device 7 is various machines such as, for example, a machine tool, an industrial robot, a forging machine, or an injection molding machine. Moreover, the manufacturing device 7 may be a machine to which a PC is connected or a server such as a web server is connected. The manufacturing device 7 forms a line or a cell in a plant, for example. The manufacturing device 7 includes a control device 1 that controls the manufacturing device 7. In FIG. 1, although a main body of the manufacturing device 7 includes the control device 1, there is no limitation thereto. For example, in the case of the manufacturing device 7 in which a PC is connected to a machine or the manufacturing device 7 in which a web server is connected to a machine, the PC or the web server may include the control device 1.

The control device 1 illustrated in FIG. 1 includes a display function control unit 10 (a first function control unit) which is a function control unit of a display unit 1a (a display device) and a control function control unit 20 (a second function control unit) which is a function control unit of a control unit 1b. As illustrated in FIG. 1, the external device 4 is connected directly to the display function control unit 10 of the control device 1 of the manufacturing device 7 via a connection interface, for example. This connection may be realized by a network. The network is a local area network (LAN), for example, and a specific communication scheme of the network, whether the network uses a cable connection or a wireless connection, and the like are not particularly limited.

[Control Device 1]

FIG. 2 is a functional block diagram of the control device 1 according to the present embodiment. The control device 1 illustrated in FIG. 2 includes a display function control unit 10 and a control function control unit 20. The control device 1 also includes a storage unit (not illustrated) in addition to the display function control unit 10 and the control function control unit 20. The display function control unit 10 and the control function control unit 20 may be a CPU and integrally control the control device 1 by executing various programs for controlling the control device 1, stored in the storage unit.

The display function control unit 10 includes a data acquisition request receiving unit 11, a data model generation unit 12, a data acquisition unit 13, a data model acquiring unit 14, and a data model integration unit 15. These functional units are realized when the display function control unit 10 executes an application program stored in the storage unit, for displaying various pieces of data on the display unit 1a.

The data acquisition request receiving unit 11 receives an acquisition request for data and a data model from the external device 4. Moreover, the data acquisition request receiving unit 11 acquires data of the control function control unit 20 from the data acquisition unit 13 and acquires a data model of the control function control unit 20 from the data model integration unit 15.

Figure 3A:
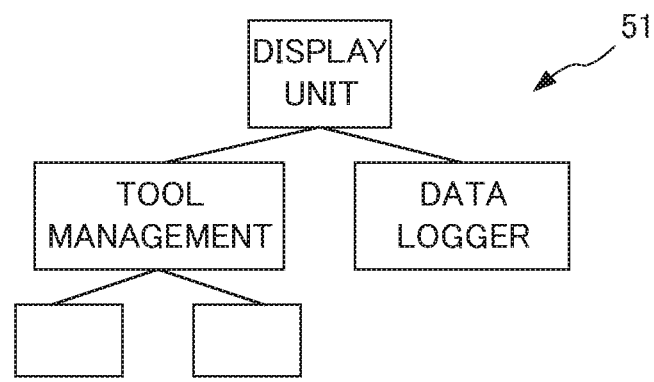
FIG. 3A is a diagram illustrating an example of a data model generated by a display function control unit according to the present embodiment.

The data model generation unit 12 generates a data model of the display function control unit 10. Here, the data model represents a data structure and is defined by the standard such as OPC UA (OPC Unified Architecture), for example. FIG. 3A illustrates an example of a data model 51 of the display function control unit 10. The data model 51 illustrated in this example shows data in a hierarchical structure.

Tool management in the data model 51 models data of a tool management application that operates in the display unit 1a. Moreover, a data logger in the data model 51 models data of a data logger that operates in the display unit 1a.

Figure 3B:
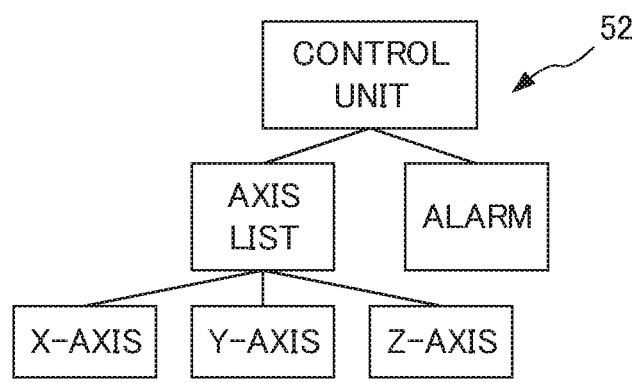
FIG. 3B is a diagram illustrating an example of a data model generated by a control function control unit according to the present embodiment.
Figure 3C:
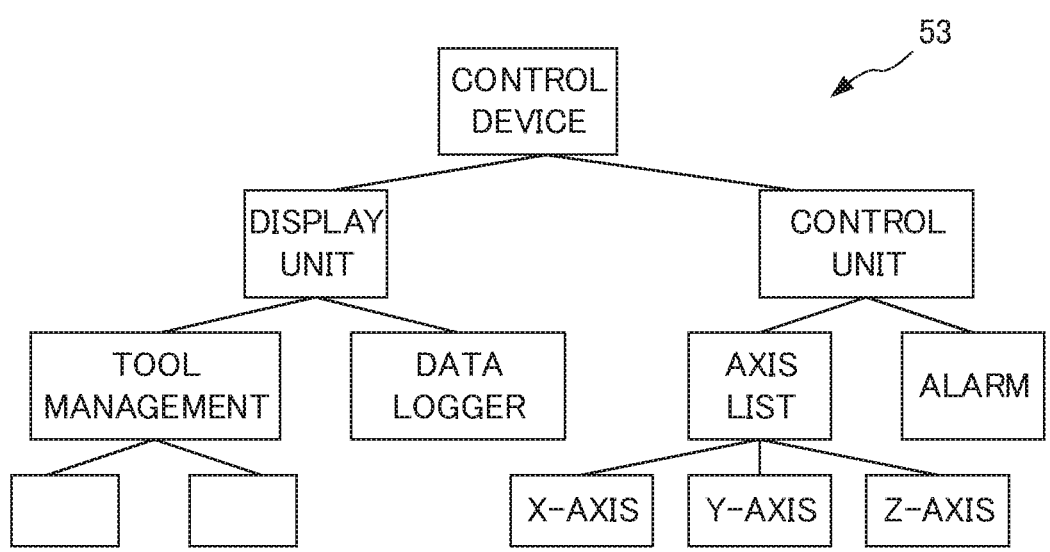
FIG. 3C is a diagram illustrating an example of a data model integrated by the display function control unit according to the present embodiment.

The data acquisition unit 13 in FIG. 2 acquires data of the control function control unit 20 from the control function control unit 20 and transmits the acquired data to the data acquisition request receiving unit 11. The data model acquiring unit 14 acquires a data model of the control function control unit 20 from the control function control unit 20 and transmits the acquired data model to the data model integration unit 15. The data model integration unit 15 integrates the data model of the display function control unit 10 generated by the data model generation unit 12 and the data model of the control function control unit 20 acquired by the data model acquiring unit 14. FIG. 3B illustrates an example of a data model 52 of the control function control unit 20 generated by the data model generation unit 22 of the control function control unit 20 to be described later. FIG. 3C illustrates an example of a data model 53 after the data model 51 of the display function control unit 10 and the data model 52 of the control function control unit 20 are integrated.

The control function control unit 20 includes a data acquisition request receiving unit 21, a data model generation unit 22, and a communication establishment determination unit 26. These function control units are realized when the control function control unit 20 executes a program stored in a storage unit.

The data acquisition request receiving unit 21 receives an acquisition request for data and a data model from the display function control unit 10. Moreover, the data acquisition request receiving unit 21 transmits data of the control function control unit 20 to the display function control unit 10. The data model generation unit 22 generates a data model of the control function control unit 20 illustrated in FIG. 3B, for example. Moreover, the data model generation unit 22 transmits the generated data model of the control function control unit 20 to the display function control unit 10. The communication establishment determination unit 26 determines whether communication for display with the display unit 1a has been established (that is, whether communication with the display function control unit 10 has been established). When the communication establishment determination unit 26 determines that the communication with the display function control unit 10 has been established, the data acquisition request receiving unit 21 and the data model generation unit 22 can transmit data and a data model to the display function control unit 10.

[Process of Control Device 1]

Figure 5A:
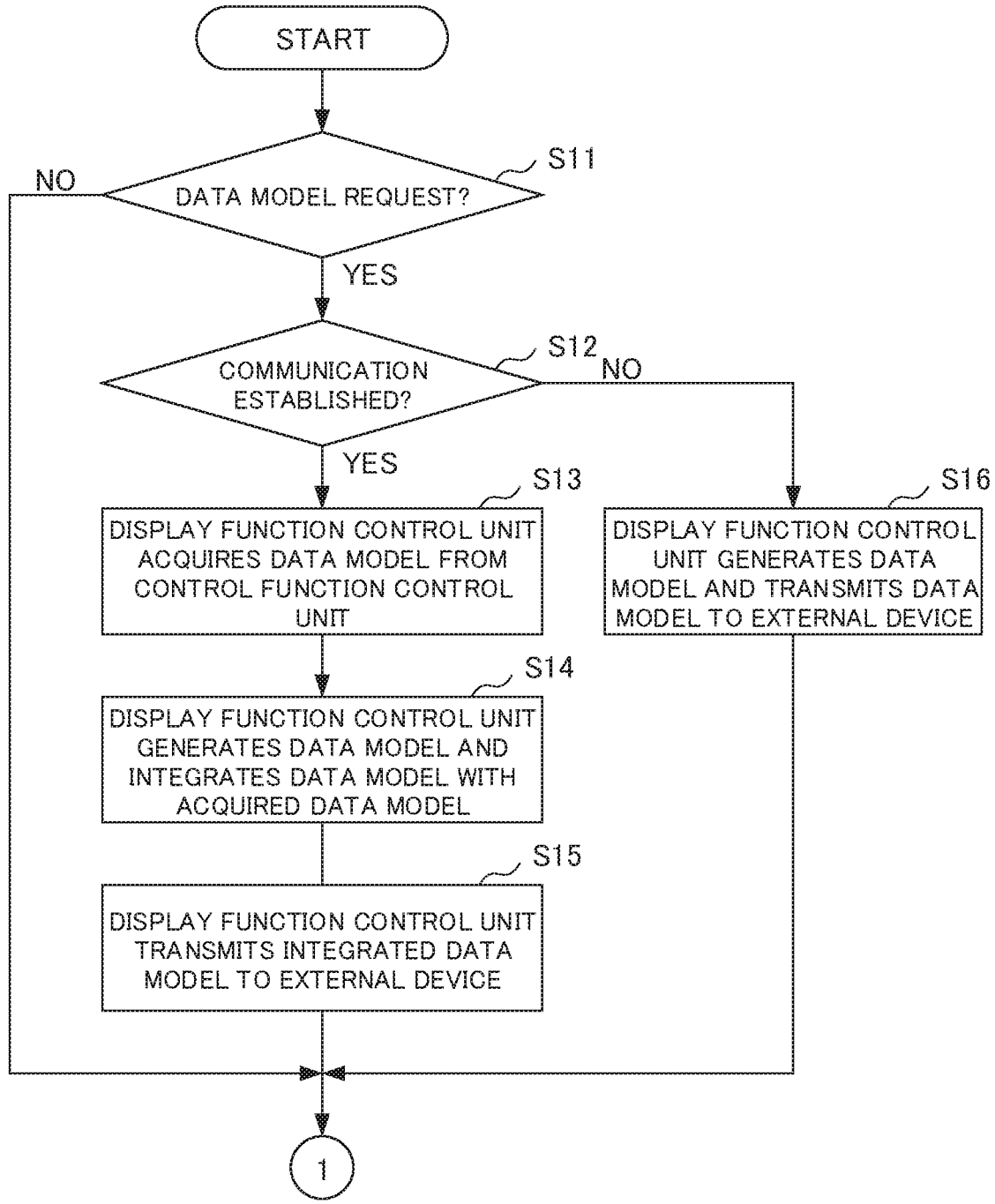
FIG. 5A is a flowchart illustrating a data acquisition and transmission process of the control device according to the present embodiment.

Next, the process of the control device 1 will be described by way of a specific example. FIG. 4 is a flowchart illustrating a data communication process of the control device 1 according to the present embodiment. FIGS. 5A and 5B are flowcharts illustrating a data acquisition and transmission process of the control device 1 according to the present embodiment.

In step S1 (hereinafter, step S will be referred to simply as "S") in FIG. 4, the control device 1 selects the display function control unit 10 as a first function control unit. In this example, although the control device 1 selects the display function control unit 10 as a first function control unit, the control function control unit 20 may be selected as the first function control unit. In the present embodiment, the display function control unit 10 has higher specification and higher processing capability than the control function control unit 20. Therefore, it is preferable that the control device 1 selects the display function control unit 10 as the first function control unit. In S2, the control device 1 is communicably connected between the display function control unit 10 and the control function control unit 20 which is a second function control unit.

In S3, the control device 1 determines whether the communication establishment determination unit 26 of the control function control unit 20 has established communication with the display function control unit 10. When it is determined that the communication establishment determination unit 26 of the control function control unit 20 has established communication with the display function control unit 10 (S3: YES), the control device 1 performs the process of S4. On the other hand, when it is determined that the communication establishment determination unit 26 of the control function control unit 20 has not established communication with the display function control unit 10 (S3: NO), the control device 1 performs the process of S5.

In S4, the data acquisition request receiving unit 21 of the control function control unit 20 disables communication with the external device 4. In this way, only the display function control unit 10 can connect to the external device 4. After that, the control device 1 performs the process of S6. On the other hand, in S5, the control device 1 outputs a communication establishment error indicating that communication between the display function control unit 10 and the control function control unit 20 cannot be established to the display unit 1a, for example.

In S6, the display function control unit 10 determines whether a data request has been received from the external device 4. When a data request has been received from the external device 4 (S6: YES), the display function control unit 10 performs the process of S7. On the other hand, when a data request has not been received from the external device 4 (S6: NO), the control device 1 performs the process of S3.

In S7, the display function control unit 10 performs a data acquisition and transmission process. Here, the data acquisition and transmission process will be described with reference to FIGS. 5A and 5B. In S11 of FIG. 5A, the data acquisition request receiving unit 11 of the display function control unit 10 determines whether a request from the external device 4 is a data model acquisition request. When the request is a data model acquisition request (S11: YES), the display function control unit 10 performs the process of S12. On the other hand, when the request is not a data model acquisition request (S11: NO), the display function control unit 10 performs the process of S17 in FIG. 5B. In S12, it is determined whether communication between the display function control unit 10 and the control function control unit 20 has been established. When the communication has been established (S12: YES), the display function control unit 10 performs the process of S13. On the other hand, when the communication has not been established (S12: NO), the display function control unit 10 performs the process of S16.

In S13, the data model acquiring unit 14 of the display function control unit 10 acquires a data model from the control function control unit 20. More specifically, the data model acquiring unit 14 of the display function control unit 10 sends a data model request to the control function control unit 20. The data model generation unit 22 of the control function control unit 20 having received the request generates the data model 52 of the control function control unit 20 illustrated in FIG. 3B, for example. Moreover, the data model generation unit 22 of the control function control unit 20 transmits the generated data model to the data model acquiring unit 14 of the display function control unit 10.

In S14, the data model generation unit 12 of the display function control unit 10 generates a data model of the display function control unit 10. The data model generation unit 12 of the display function control unit 10 generates the data model 51 of the display function control unit 10 illustrated in FIG. 3A, for example. Moreover, the data model integration unit 15 of the display function control unit 10 integrates the data model generated by the data model generation unit 12 and the data model of the control function control unit 20 acquired in S12 to generate the data model 53 illustrated in FIG. 3C, for example.

In S15, the data acquisition request receiving unit 11 of the display function control unit 10 transmits the data model integrated by the data model integration unit 15 to the external device 4. After that, the display function control unit 10 performs the process of S17 in FIG. 5B. On the other hand, in S16, the data model generation unit 12 of the display function control unit 10 generates a data model of the display function control unit 10. Moreover, the data acquisition request receiving unit 11 of the display function control unit 10 transmits the data model generated by the data model generation unit 12 to the external device 4.

In S17 of FIG. 5B, the data acquisition request receiving unit 11 of the display function control unit 10 determines whether a request from the external device 4 is a data acquisition request. When the request is a data acquisition request (S17: YES), the display function control unit 10 performs the process of S18. On the other hand, when the request is not a data acquisition request (S17: NO), the display function control unit 10 performs the process of S3 in FIG. 4.

In S18, the data acquisition request receiving unit 11 of the display function control unit 10 determines whether the data acquisition request is a request for the data of the control function control unit 20. When the request is a request for the data of the control function control unit 20 (S18: YES), the display function control unit 10 performs the process of S19. On the other hand, when the request is not a request for the data of the control function control unit 20 (S18: NO), the display function control unit 10 performs the process of S21.

In S19, it is determined whether communication between the display function control unit 10 and the control function control unit 20 has been established. When the communication has been established (S19: YES), the display function control unit 10 performs the process of S20. On the other hand, when the communication has not been established (S19: NO), the display function control unit 10 cannot acquire the data of the control function control unit 20. Therefore, the display function control unit 10 performs the process of S3 in FIG. 4.

In S20, the data acquisition unit 13 of the display function control unit 10 acquires data from the control function control unit 20. More specifically, the data acquisition unit 13 of the display function control unit 10 sends a data request to the control function control unit 20. The data acquisition request receiving unit 21 of the control function control unit 20 having received the request transmits the data of the control function control unit 20 to the data acquisition unit 13 of the display function control unit 10. In S21, the data acquisition request receiving unit 11 of the display function control unit 10 transmits the data to the external device 4. In this case, when the display function control unit 10 has acquired the data of the control function control unit 20 in S20, the data of the display function control unit 10 and the acquired data of the control function control unit 20 are transmitted to the external device 4. Moreover, when the display function control unit 10 has not acquired the data of the control function control unit 20, the data of the display function control unit 10 is transmitted to the external device 4. After that, the control device 1 performs the process of S3 in FIG. 4.

In this way, when the control device 1 includes a plurality of function control units such that the control device 1 has the display function control unit 10 and the control function control unit 20, for example, the control device 1 allows only the display function control unit 10 which is the first function control unit to be connected to the external device 4. Moreover, the display function control unit 10 acquires the data model and the data from the control function control unit 20 to integrate the data and the data model with the data model of the display function control unit 10 and then, transmits the integrated data model to the external device 4. Therefore, the external device 4 can acquire the data models and the data of the plurality of function control units without grasping the configuration of the control device 1 having the plurality of function control units. Moreover, the external device 4 can acquire a data model in which the data structures of the display unit 1$a$ and the control unit 1$b$ are integrated.

The programs used in the present invention can be stored using various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). In addition, the programs may be supplied to a computer by way of various types of transitory computer readable media. Examples of transitory computer readable media include electrical signals, optical signals and electromagnetic waves. The transitory computer readable media can supply programs to a computer via wired communication paths such as electrical wires and optical fiber, or a wireless communication path.

The above-described embodiment is a preferred embodiment of the present invention. However, the scope of the present invention is not limited to the embodiment only but the present invention can be embodied in various modifications without departing from the spirit of the present invention.

(Modification)

Figure 6:
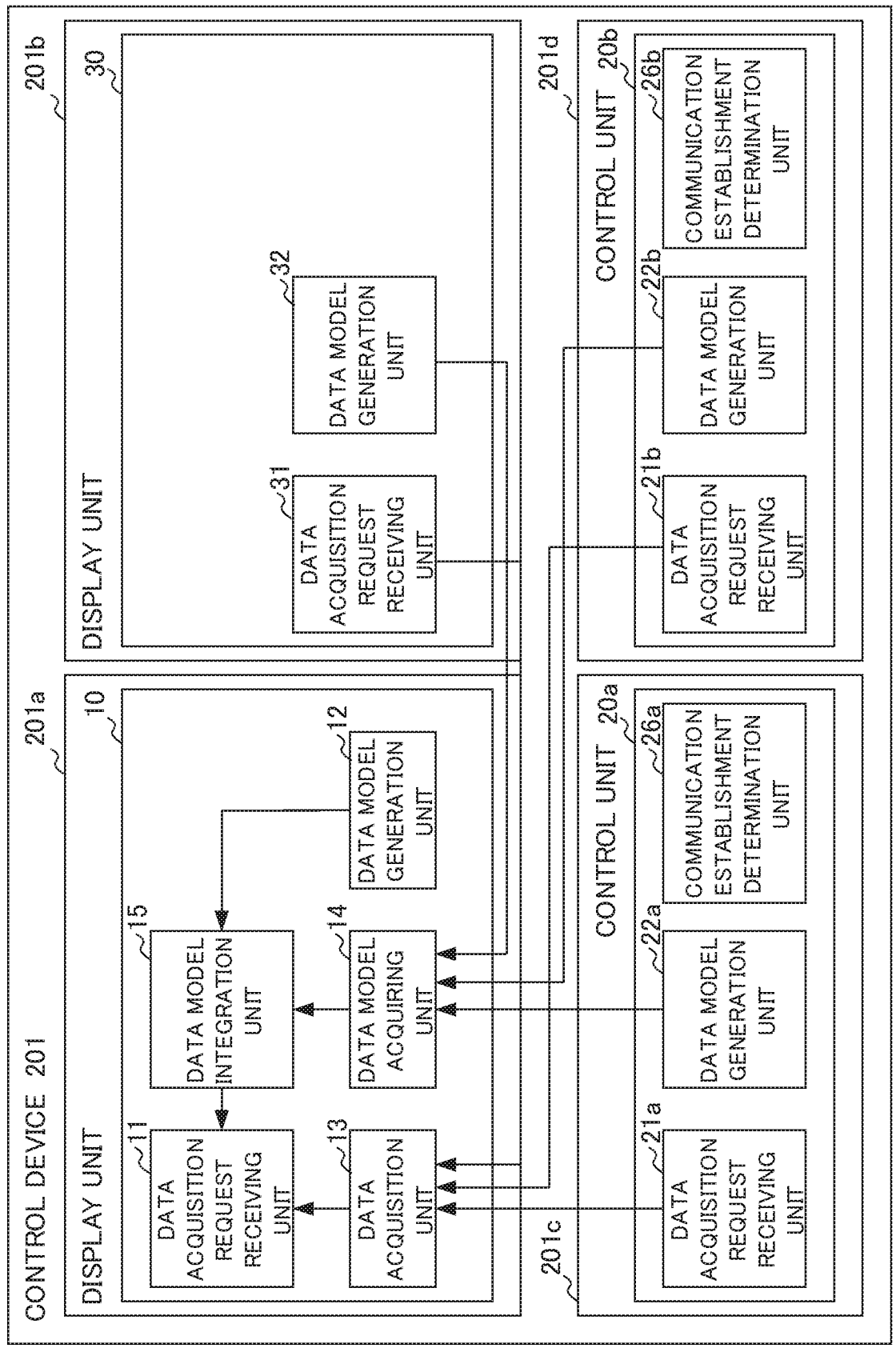
FIG. 6 is a functional block diagram of a control device according to a modification.
Figure 7A:
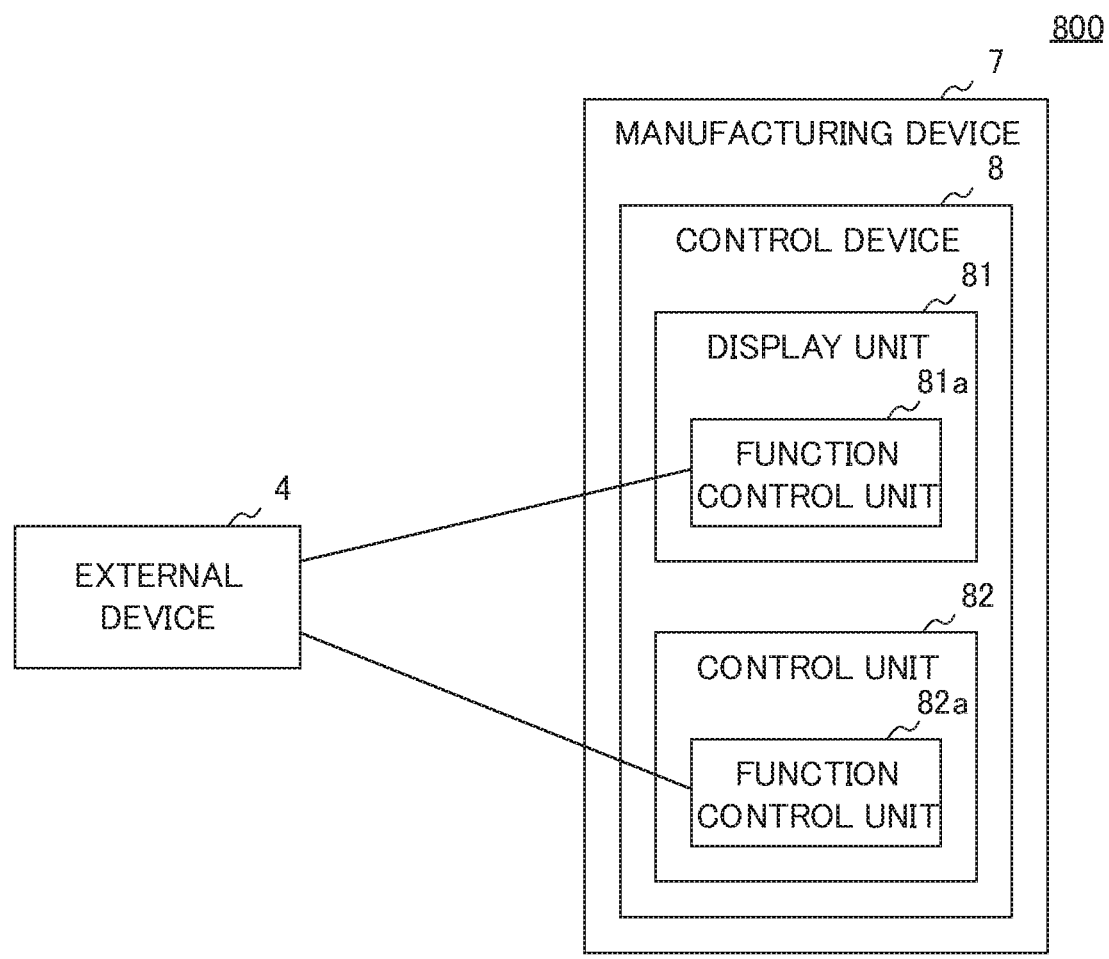
FIG. 7A is a general view of a conventional monitoring system.
Figure 7B:
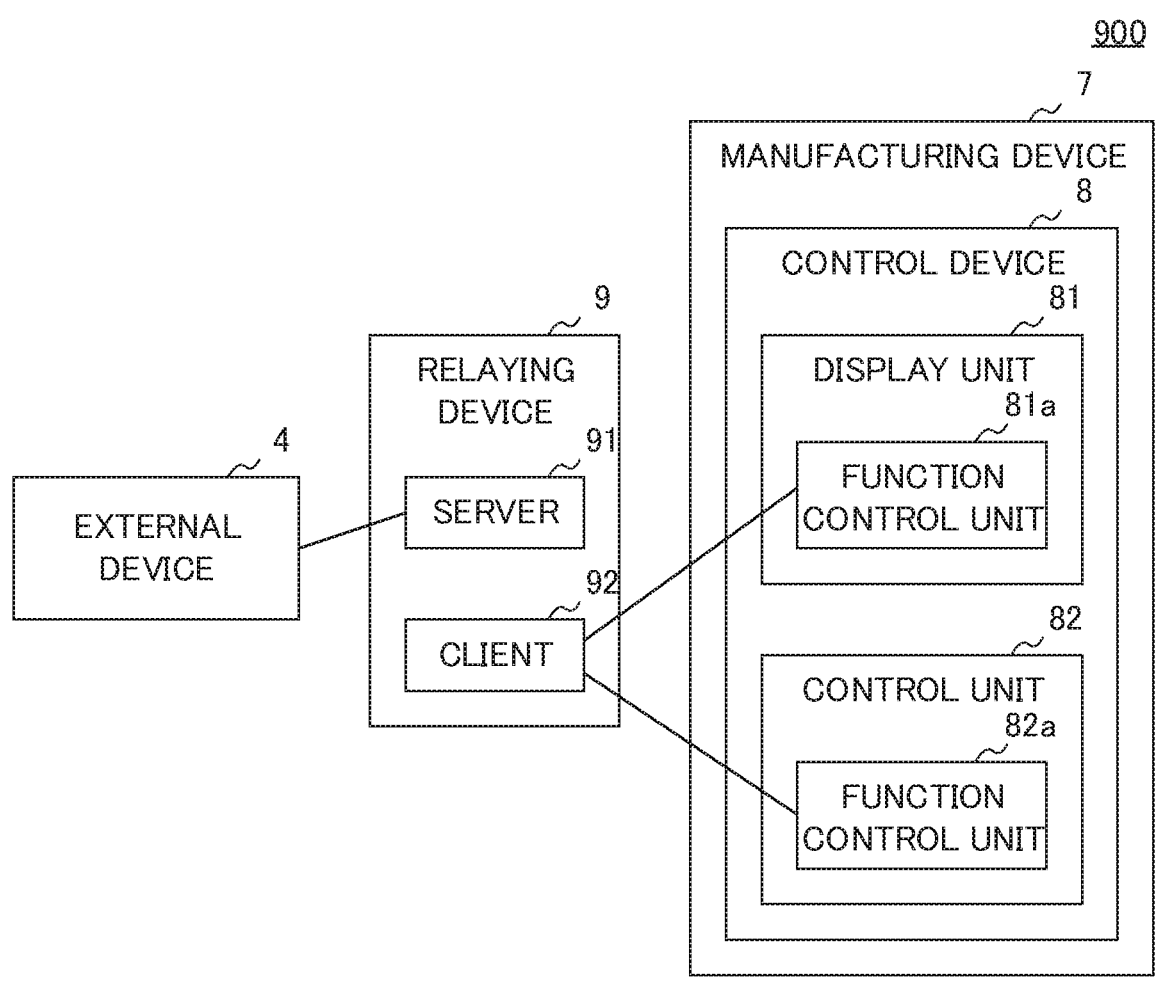
FIG. 7B is a general view of a conventional monitoring system.

In the above-described embodiment, although a case in which the control device includes one function control unit of the display unit and one function control unit of the control unit has been described as an example, there is no limitation thereto. For example, the control device may have m function control units of the display unit and n function control units of the control unit (where m and n are natural numbers). FIG. 6 is a functional block diagram of a control device 201 according to a modification. The control device 201 includes function control units of two display units 201$a$ and 201$b$ and function control units of two control units 201$c$ and 201$d$. The display function control unit 10 is a function control unit of the display unit 201$a$ and is a first function control unit having a configuration similar to that of the above-described embodiment.

On the other hand, the display function control unit 30 is a function control unit of the display unit 201$b$ and is a second function control unit. The display function control unit 30 includes a data acquisition request receiving unit 31 and a data model generation unit 32. The data acquisition request receiving unit 31 and the data model generation unit 32 have functions similar to those of the data acquisition request receiving unit 21 and the data model generation unit 22 of the above-described embodiment. The display function control unit 30 does not have a communication establishment determination unit but may naturally have a communication establishment determination unit. That is, the communication establishment determination unit may be included in some or all of the second function control units.

The control function control units 20a and 20b are the function control units of the two control units 201c and 201d and have a configuration similar to that of the control function control unit 20 of the above-described embodiment. In the control device 201, the display function control unit 10 acquires the data models and the data of the display function control unit 30 and the control function control units 20a and 20b and integrates the data models and the data with the data model of the display function control unit 10. Moreover, the display function control unit 10 performs communication with the external device 4 and transmits the data model and the data of the control device 201 on the basis of a request from the external device 4.

Furthermore, the control device may include a plurality of function control units of the control unit and may not include a function control unit of the display unit. In this case, one function control unit among the plurality of function control units may be used as a first function control unit having the same function as the display function control unit 10 of the above-described embodiment, and the other function control unit may be used as a second function control unit having the function of the control function control unit 20 of the above-described embodiment.

EXPLANATION OF REFERENCE NUMERALS 1, 201: Control device
4: External device
7: Manufacturing device
10, 30: Display function control unit
11, 21, 21a, 21b, 31: Data acquisition request receiving unit
12, 22, 22a, 22b, 32: Data model generation unit
13: Data acquisition unit
14: Data model acquiring unit
15: Data model integration unit
20, 20a, 20b: Control function control unit
26, 26a, 26b: Communication establishment determination unit
51, 52, 53: Data model
100: Monitoring system

What is claimed is:

1. A control device of a manufacturing device, including a plurality of hardware function controllers, wherein
   each of the plurality of hardware function controllers includes a first hardware function controller and a second hardware function controller and is configured to generate a respective data model,
   the first hardware function controller among the plurality of hardware function controllers is configured to execute at least one program to:
   acquire a data model generated by the second hardware function controller other than the first hardware function controller;
   integrate a data model generated by the first hardware function controller with the data model acquired from the second hardware function controller in order to generate an integrated data model; and
   transmit the integrated data model via a communication interface to an external apparatus sending a data model acquisition request, and
   wherein each of the plurality of hardware function controllers is configured to receive the data model acquisition request, but only the first hardware function controller among the plurality of hardware function controllers is configured to connect to the external apparatus, and
   the first hardware function controller transmits the integrated data model to the external apparatus upon receiving the data model acquisition request from the external apparatus.

2. The control device according to claim 1, wherein the first hardware function controller acquires data of the second hardware function controller, and
   the first hardware function controller transmits the data of the second hardware function controller acquired and data of the first hardware function controller to the external apparatus upon receiving a data acquisition request from the external apparatus.

3. The control device according to claim 1, wherein some or all of the second hardware function controllers determine whether communication with the first hardware function controller has been established.

4. The control device according to claim 1, wherein the first hardware function controller controls a display device.

5. A monitoring system comprising:
   a control device of a manufacturing device including a plurality of hardware function controllers, wherein
   each of the plurality of hardware function controllers includes a first hardware function controller and a second hardware function controller and is configured to generate a respective data model,
   the first hardware function controller among the plurality of hardware function controllers is configured to execute at least one program to:
   acquire a data model generated by the second hardware function controller other than the first hardware function controller,
   integrate a data model generated by the first hardware function controller with the data model acquired from the second hardware function controller in order to generate an integrated data model, and
   transmit the integrated data model via a communication interface in response to a data model acquisition request; and
   an external apparatus connected to the control device and configured to send the data model acquisition request to the control device and receive the integrated data model transmitted by the control device, and
   wherein each of the plurality of hardware function controllers is configured to receive the data model acquisition request, but only the first hardware function controller among the plurality of hardware function controllers is configured to connect to the external apparatus, and
   the first hardware function controller transmits the integrated data model to the external apparatus upon receiving the data model acquisition request from the external apparatus.

* * * * *